United States Patent
Small et al.

(10) Patent No.: US 8,902,202 B2
(45) Date of Patent: *Dec. 2, 2014

(54) METHOD AND APPARATUS FOR SENSING AN INPUT OBJECT RELATIVE TO A SENSING REGION OF AN ULTRASOUND SENSOR DEVICE

(71) Applicant: Synaptics Incorporated, San Jose, CA (US)

(72) Inventors: Jeffrey A. Small, Rochester, NY (US); Clyde Washburn, Rochester, NY (US)

(73) Assignee: Synaptics, Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,450

(22) Filed: Apr. 18, 2014

(65) Prior Publication Data

US 2014/0225873 A1    Aug. 14, 2014

Related U.S. Application Data

(63) Continuation of application No. 13/289,732, filed on Nov. 4, 2011, now Pat. No. 8,711,128.

(60) Provisional application No. 61/410,774, filed on Nov. 5, 2010.

(51) Int. Cl.
*G06F 3/043*    (2006.01)
*G06F 3/041*    (2006.01)

(52) U.S. Cl.
CPC ............ *G06F 3/0436* (2013.01); *G06F 3/0412* (2013.01)
USPC ......................................... 345/177

(58) Field of Classification Search
USPC ......................................... 345/177
See application file for complete search history.

(56) References Cited

U.S. PATENT DOCUMENTS

| | | | |
|---|---|---|---|
| 4,866,986 A | 9/1989 | Cichanski | |
| 5,394,003 A | 2/1995 | Bales et al. | |
| 6,078,315 A | 6/2000 | Huang | |
| 6,537,216 B1 | 3/2003 | Shifrin | |
| 6,593,917 B2 | 7/2003 | Toda | |
| 6,621,341 B1 | 9/2003 | Shifrin | |
| 6,741,237 B1 | 5/2004 | Benard et al. | |
| 7,187,369 B1 | 3/2007 | Kanbara et al. | |
| 7,207,222 B2 | 4/2007 | Thompson et al. | |

(Continued)

OTHER PUBLICATIONS

MacEachern et al. "A Charge-Injection Method for Gilbert Cell Biasing," IEEE, 1998.

(Continued)

*Primary Examiner* — Fred Tzeng
(74) *Attorney, Agent, or Firm* — Patterson & Sheridan, LLP

(57) ABSTRACT

A subsystem, system and method for sensing an input object relative to a sensing region of an ultrasound sensor device are disclosed herein. In one embodiment, a subsystem for sensing an input object relative to a sensing region of an ultrasound sensor device includes a circuit, a switch coupled to an output of the circuit, and an integrating capacitor coupled to the output of the circuit. The circuit has an input for receiving a resulting signal comprising positive and negative polarities, the resulting signal having effects indicative of the input object relative to the sensing region. The integrating capacitor is also coupled to a substantially constant voltage source and to the switch. The circuit is operable to output a rectified signal to the first integrating capacitor indicative of the input object relative to a sensing region.

20 Claims, 5 Drawing Sheets

(56) References Cited

U.S. PATENT DOCUMENTS

| | | |
|---|---|---|
| 7,265,746 B2 | 9/2007 | Knowles et al. |
| 7,892,175 B2 | 2/2011 | Wakabayashi et al. |
| 2008/0074182 A1 | 3/2008 | Hoelzle et al. |
| 2011/0285244 A1 | 11/2011 | Lewis et al. |

OTHER PUBLICATIONS

Hedayati et al. "A Low Voltage High Linearity CMOS Gilbert Cell Using Charge Injection Method," World Academy of Science, Engineering and Technology, 2008.

METHOD AND APPARATUS FOR SENSING AN INPUT OBJECT RELATIVE TO A SENSING REGION OF AN ULTRASOUND SENSOR DEVICE

CROSS REFERENCE TO RELATED APPLICATIONS

This invention is a continuation application of U.S. patent application Ser. No. 13/289,732, filed Nov. 4, 2011, which is incorporated by reference in its entirety, and which claims benefit of U.S. Provisional Patent Application Ser. No. 61/410,774, filed Nov. 5, 2010, and titled "TFT RECEIVER FOR PIEZOELECTRIC TRANSDUCER ARRAY", which are incorporated by reference in their entireties.

FIELD OF INVENTION

Embodiments of the invention generally relate to a subsystem, a system and method for sensing an input object relative to a sensing region of an ultrasound sensor device.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computer systems (such as touch screens integrated in cellular phones).

Many commercially available proximity sensor devices utilized capacitive and optical sensing. Capacitive sensing, although having a robust history of use, is susceptible to geometric distortion or edge effects at the perimeter of the sensing region, and is also susceptible to damage and/or inaccurate output due to electromagnetic interference (EMI) and electromagnetic discharge (ESD). Moreover, capacitive sensing is limited to the detection of conductive objects relative to the sensor, thus limiting the types of inputs devices which may be utilized. The accuracy of optical sensing devices may be diminished due to the effects of dirt, oils and other contaminants.

Ultrasound sensing has been recognized as a potential improvement for next generation touch panel devices. However, significant challenges remain in the development of ultrasound sensing prior to acceptance for commercially viable use.

Therefore, there is a need for an improved subsystem, system and method for sensing an input object relative to a sensing region of an ultrasound sensor device.

SUMMARY OF INVENTION

A subsystem, system and method for sensing an input object relative to a sensing region of an ultrasound sensor device are disclosed herein. In one embodiment, a subsystem for sensing an input object relative to a sensing region of an ultrasound sensor device includes a circuit, a switch coupled to an output of the circuit, and an integrating capacitor coupled to the output of the circuit. The circuit has an input for receiving a resulting signal comprising positive and negative polarities, the resulting signal having effects indicative of the input object relative to the sensing region. The integrating capacitor is also coupled to a substantially constant voltage source and to the switch. The circuit is operable to output a rectified signal to the first integrating capacitor indicative of the input object relative to a sensing region.

In another embodiment, a system for sensing an input object relative to a sensing region of an ultrasound sensor device includes a detection module having an input coupled to an array of sensor electrodes disposed on a substrate. The array of sensor electrodes are operable to provide resulting signals, each comprising positive and negative polarities in response to presence of the input object in the sensing region. The detection module is operable to integrate charges onto integrating capacitors of the detection module with rectified signals in response to receiving the resulting signals from the array of sensor electrodes.

In another embodiment, a method for sensing an input object relative to a sensing region of an ultrasound sensor device is provided that includes receiving a resulting signal and charging an integrating capacitor with a rectified signal in response to receiving the resulting signal. The resulting signal includes positive and negative polarities. The first resulting signal also includes effects indicative of the input object relative to the sensing region.

BRIEF DESCRIPTION OF DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

Description of Embodiments

The following Description of Embodiments is merely provided by way of example and not of limitation. Furthermore, there is no intention to be bound by any expressed or implied theory presented in the preceding technical field, background, brief summary or the following detailed description. Various embodiments of the present invention provide input devices and methods that facilitate improved usability of a touch screen device.

Figure 1:
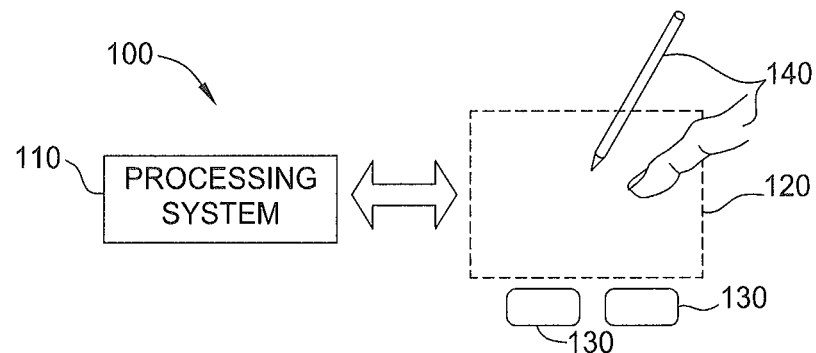
FIG. 1 is a schematic block diagram of an exemplary input device, in accordance with embodiments of the invention.

FIG. 1 is a schematic block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such a desktop computers, laptop computers, notebook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be one the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc.

In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use ultrasonic, capacitive, elastive, resistive, inductive, surface acoustic wave, and/or optical techniques to provide one or more resulting signals which include positive and negative polarities, the one or more resulting signals including effects indicative of the input object relative to the sensing region.

Some implementations are configured to provide images that span one, two, three or higher dimensional spaces. Some implementations are configured to provide projections of input along particular axes or planes.

In FIG. 1, the processing system (or "processor") 110 is shown as a part or subsystem of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

The input device 100 may be based on ultrasound technology, and detect input objects using the differences in the acoustic index of refraction of the materials in the paths of the ultrasound waves. The ultrasound waves reflect at the interfaces of different acoustic indices of refraction. The reflections indicate what was in the paths of these waves, and where they were located along the paths. Thus, ultrasound sensor devices can obtain information from reflected ultrasound waves about locations and characteristics of materials encountered.

Compared to some other touch sensing technologies, ultrasound sensor devices may be made less susceptible to EMI, to ESD, to geometric distortion, to edge effects, to contamination by dirt or oils, etc. Ultrasound sensor devices may also be made thin, and some embodiments may be just a few mm thick. Further, ultrasound sensor devices can respond to input by objects regardless of the conductivity, the optical reflectivity, or other aspects of the input objects, thus making selection using the input device more convenient, versatile and efficient for the user.

Figure 2:
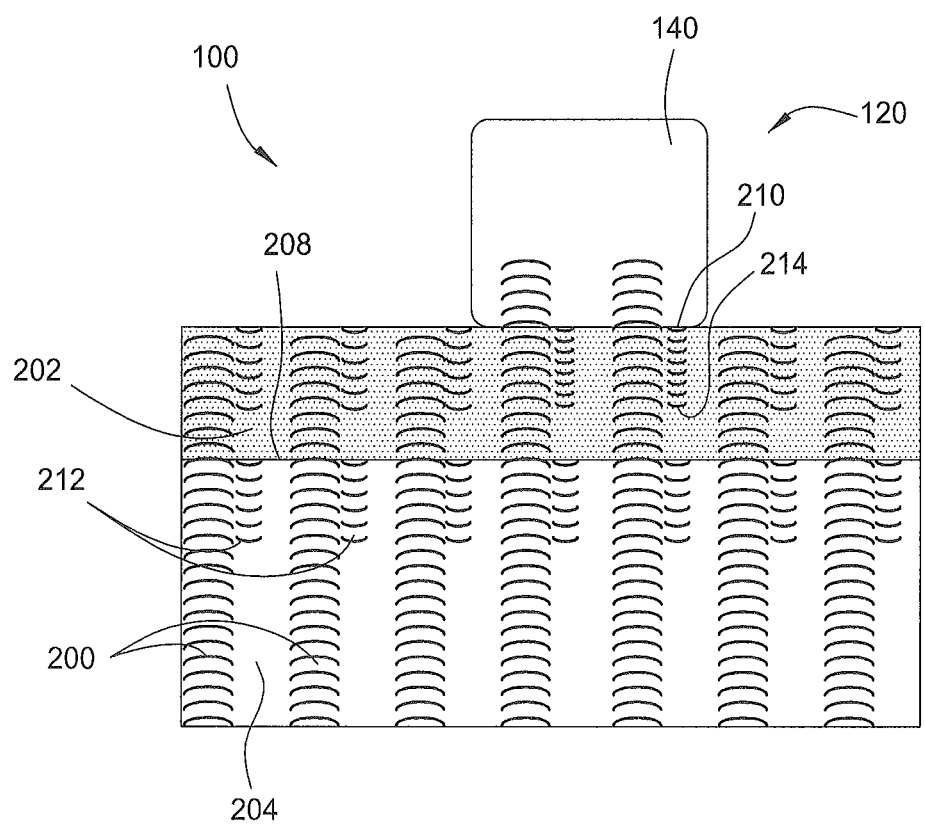
FIG. 2 is a partial schematic of an exemplary input device illustrating an example of a ultrasound wave (i.e. a transmitter signal) interfacing with an input object and a sensor module of the input object.

FIG. 2 is a partial schematic of the exemplary input device 100 illustrating an example of an ultrasound wave (i.e., a transmitter signal 200) penetrating a cover material 202 disposed over a sensor module 204 of the input device 100 and interfacing with the input object 140. The sensor module 204 is configured to make available the resulting signal, which includes effects indicative of the input object 140 relative to the sensing region 120, to the processing system 110. In the embodiment depicted in FIG. 2, the input object 140 is in contact with the cover material 202. The ultrasound wave encounters two interfaces 208, 210 where the different acoustic indices of refraction change. Thus, the ultrasound waves reflect at each of these interfaces 208, 210. These reflected ultrasound waves 212, 214 ("echoes") carry information about the acoustic environment. Echoes are also further reflected as they encounter other interfaces (not shown) with unmatched acoustic indices of refraction, so the actual map of ultrasound waves is much more complicated than what is shown in FIG. 2. The sensor module 204 receives the echoes that reach the sensor module 204, and uses these echoes to determine information about what caused the reflections by making available the resulting signal to the processing system 110.

Any appropriate ultrasound transmitter technology may be used to generate the ultrasound waves used by the input device 100. For example, ultrasound transmitters may use piezoelectric technology to provide an ultrasound transmitter signal which may be driven onto the sensor module 204. The ultrasound transmitters may also be of any appropriate shape and cover any appropriate number of dimensions. For example, a transmitter may be in the form of a point transmitter, a linear transmitter, a planar transmitter, or combinations of two or more thereof. Other example transmitter designs may incorporate curved lines or surfaces, multiple ultrasound transmitters, etc.

Similarly, any appropriate ultrasound detector technology may be used to detect the echoes. For example, ultrasound detectors may use piezoelectric technology to generate a signal indicative of the input object 140 relative to the sensing region 120. The ultrasound detectors may also be of any appropriate shape and cover any appropriate number of dimensions. For example, the detector may be in the form of a point ultrasound detector, a one-dimensional (1D) linear ultrasound detector, a two-dimensional (2D) ultrasound detector, or combinations of two or more thereof. Other example ultrasound detector designs may incorporate curved lines or surfaces, multiple detectors, etc.

Ultrasound detectors, such as but not limited to those described above, may be configured to detect near-field images, or far-field images with beam steering to some part farther away from the sensor. For example, a 2D detector may acquire a near-field C-mode image of ultrasound reflectivity in a plane that is parallel to the plane of the transducers. As another example, a linear detector may be used to acquire a B-mode image of ultrasound reflectivity in a plane that contains the line of detectors. As a further example, a planar detector may be used to acquire a three-dimensional image of space near the detector.

Further, the ultrasound transmitter and ultrasound detector may comprise components configured to both transmit as well as receive, or components that are dedicated for either transmission or reception. For example, some ultrasound transducers are well suited to transmit ultrasound as well as receive ultrasound, and so can be used as ultrasound transmitters and as ultrasound detectors. This may be done in some embodiments using a time-multiplexed approach. As another example, some transducers are better suited for transmission and some transducers are better suited for reception. Other considerations in whether or not to use combined or dedicated ultrasound transmitters and receivers include the type of image to be obtained, the type of object to be imaged, the physical geometry and arrangement of components of the system, etc.

Figure 3:
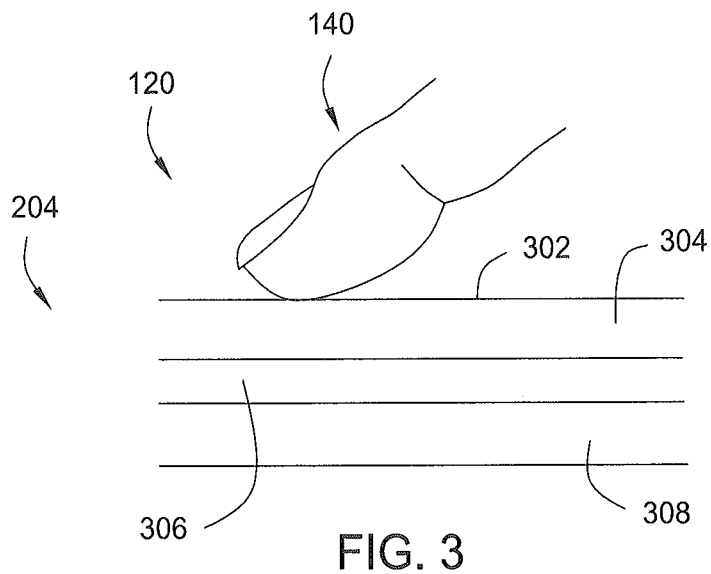
FIG. 3 illustrates an example stack-up of one embodiment of a sensor module that may be used in the input device to sense the input object.

FIG. 3 shows an example stack-up of one embodiment of a sensor module 204 that may be used in the input device 100 to sense the input object 140 (shown as a finger in FIG. 3) that is contacting an input surface 302 in the sensing region 120. The input surface 302 is provided by a platen 304 disposed between the input object 140 and a sensor element 306 of the sensor module 204. The sensor element 306 may be configured as the ultrasound transmitter, the detector, or a combined ultrasound transmitter and detector. If the acoustic index of the refraction of the typical input object is known, the platen 304 may be configured to have a similar acoustic index of refraction in some embodiments. A backing 308 is shown supporting both the platen 304 and the sensor element 306.

Figure 4:
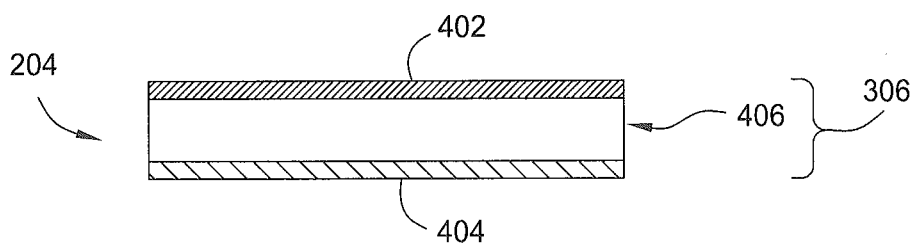
FIG. 4 is a partial cross sectional schematic view of one embodiment of the sensor element.

FIG. 4 is a partial cross sectional schematic view of one embodiment of the sensor element 306. The sensor module 204 generally includes a plurality of sensor elements 306, each of which operable to make available a resulting signal to the processing system 110 of the input device 100. The sensor element 306 generally includes a first electrode 402 and a second electrode 404 sandwiching a piezoelectric material 406.

The piezoelectric material 406 in the sensor element 306 when used as a piezoelectric transducer deforms in response to an applied charge (positive or negative). In a piezoelectric ultrasound transmitter application, charge can be applied to deform the piezoelectric material 406 to create ultrasound waves. Also, piezoelectric material 406 in the sensor element 306 when used as a piezoelectric detector will supply or sink charge in response to deformation. In an ultrasound detector application, ultrasound waves impacting the sensor element 306 apply a force, which deforms the piezoelectric material 406, thus generating charge. The instantaneous force applied by ultrasound waves is the instantaneous sound pressure integrated over the relevant sensor area of the sensor element 306. This force is generally monotonic with respect to the sound pressure level of the incident waves multiplied by the relevant sensor area of the sensor element 306. This force usually creates a charge that is roughly proportional to the applied force, over the operating range of the sensor element 306.

Piezoelectric transducers used in sensor elements 306 suitable for ultrasound detection may generate a resulting charge transfer on the order of 1-20 picoCoulombs per Newton of applied force. This charge transfer may be measured directly, amplified, integrated on a capacitor of the processing system 110 to produce a voltage, etc. In one embodiment, the instantaneous rate of charge transfer (Coulombs/second) is current. This current may be converted to a voltage (such as by passing it through a resistor).

In those embodiments where the sensor element 306 is used as an ultrasound detector, the first electrode 402 may be connected to a reference node such as ground and a receiver circuit of the processing system 110 may be coupled to the second electrode 404 to receive the output of the sensor element 306 for analysis. In those embodiments where sensor module 204 is fabricated from an array of sensor elements 306 configured as piezoelectric transducers, the processing system 110 may include an array of corresponding receiver circuits coupled to the array of sensor elements 306.

The sensor elements 306 configured as ultrasound detectors may be designed and sized based on the finest feature that the sensor module 204 would be configured to detect. For example, sensor elements 306 with sensing surfaces of 50 μm×50 μm may be fine enough to distinguish ridges and valleys of human fingerprints. Ultrasound detectors with larger sensing surfaces, or sensing surfaces having different aspect ratios, may distinguish between larger objects. Where the sensing surfaces are small, the resulting charge per transducer due to ultrasound reflections during normal operation may be too small to measure accurately with simple circuits. Some embodiments accumulate charge over multiple cycles to increase the size of the charge being measured.

As the leading edge of an ultrasound reflection compresses the piezoelectric material 406 of the sensor element 306, a charge of the polarity associated with compression results. Then, as the trailing edge of an ultrasound pulse decompresses the piezoelectric material 406 of the sensor element 306, a charge associated with decompression (of opposite polarity) results. Some embodiments of the processing system 110 rectify these opposite-polarity charges to the same polarity as further discussed below.

Figure 5:
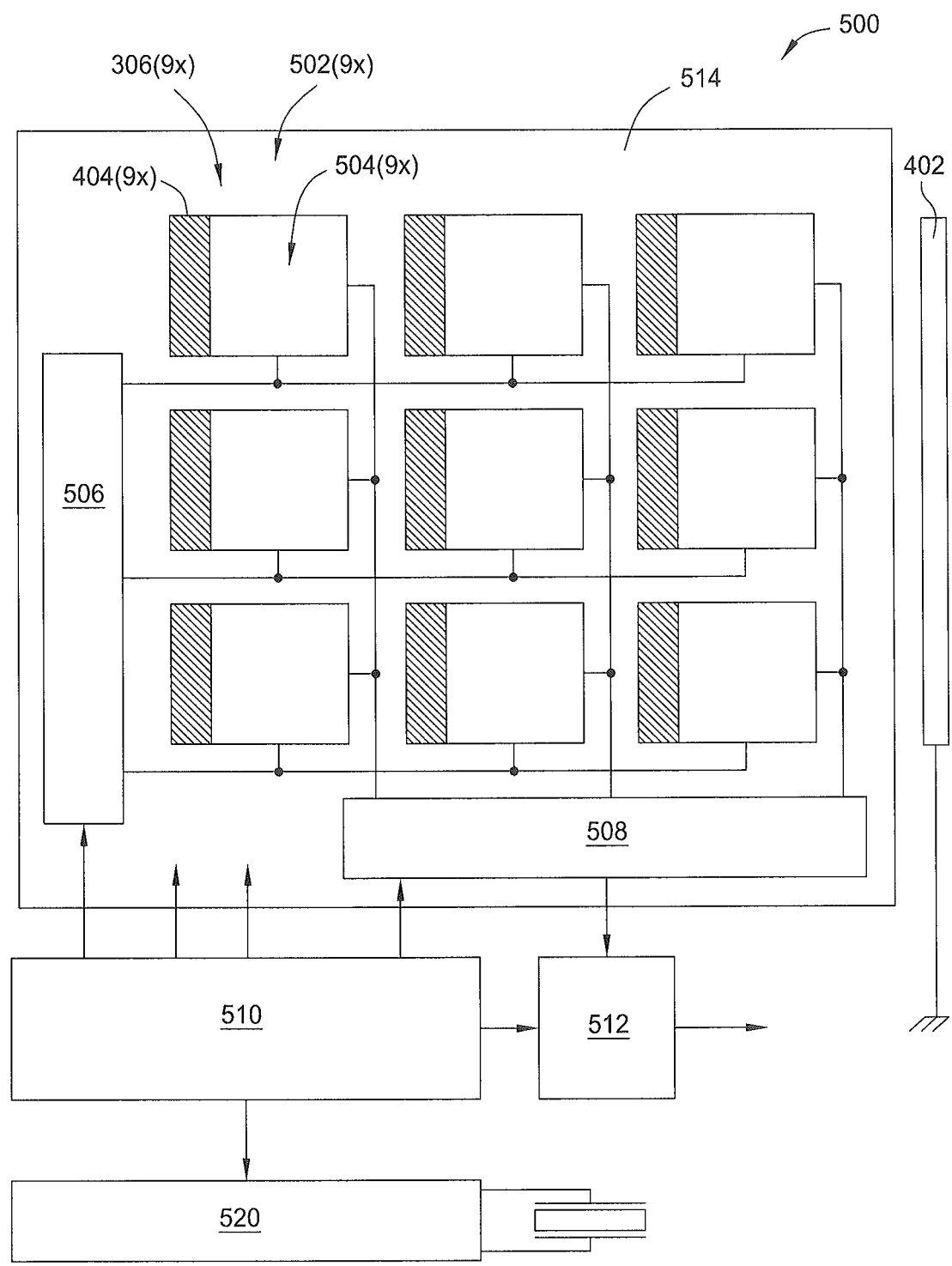
FIG. 5 is a schematic diagram illustrating one example of an array of sensor elements configured as piezoelectric detectors coupled to a detection module of a processing system.

FIG. 5 is a schematic diagram illustrating one example of an array 500 of sensor elements 306 configured as piezoelectric detectors coupled to a detection module 502 of the processing system 110. Although the exemplary array 500 of FIG. 5 has three rows and three columns of sensor elements 306, the array 500 of sensor elements 306 may be arranged in alternative configurations having more or less sensor elements 306 comprising the sensor module 204. The detection module 502 includes receiver circuits 504, and in the embodiment illustrated in FIG. 5, each receiver circuit 504 is coupled to a respective one of the sensor elements 306 of the sensor module 204.

In one embodiment, the detection module 502 is fabricated using TFT (thin-film-transistor) technology on an appropriate substrate 514, such as glass, plastic, or other suitable substrate, on which the sensor elements 306 are formed. In another embodiment, at least a portion of the detection module 502 is formed by an integrated circuit, i.e., a chip, which may be mounted proximate the substrate 514 on which the sensor elements 306 are formed, for example on a flexible tail secured to the substrate 514. In another embodiment, at least a portion of the detection module 502 may be physically integrated in other parts of the electronic system utilizing the input device 100.

The processing system 110 may also include a row select module 506 and a column multiplexer module 508. The row select module 506 is a logic circuit operable to select among the different rows of sensor elements 306. The column multiplexer module 508 multiplexes the readout of the columns of sensor elements 306 to readout circuitry 512. The inclusion of the row select module 506 and the column multiplexer module 508 may reduce the number of different readout circuits utilized in the input device 100.

In the example illustrated in FIG. 5, a timing module 510 and/or a transmitter module 520 may be included as part of the processing system 110. The timing module 510 generates timing signals that synchronizes the different modules of the processing system 110. For example, a first signal generated by the timing module 510 may be provided to the transmitter module 520. The transmitter module 520 may be configured to drive a transmitter signal onto the array 500 of sensor elements 306. The transmitter signal may be an ultrasound wave generated by an ultrasound driver of the transmitter module 520. Although the transmitter module 520 is shown as a separate component from the sensor elements 306 in FIG. 5, the transmitter module may share none, some, or all of the components of the sensor elements 306.

In another example, the timing module 510 may generate one or more timing signals utilized by the detection module 502 to process the resulting signals received from the array 500. In the embodiment of FIG. 5, the timing module 510 provides a first timing signal and a second timing signal to the detection module 502 which is utilized to selectively activate the detection module 502 to charge an integrating capacitor of the detection module 502, as further discussed below with reference to FIG. 6. The timing module 510, transmitter module 520, may be mounted to the substrate 514 or other portion of the input device 100.

Continuing to refer to FIG. 5, in one embodiment, the exemplary array 500 includes nine second electrodes 404 of each piezoelectric sensor element 306 associated with each receiver circuit 504. Each piezoelectric sensor element 306 shares the same first electrode 402. In other embodiments, array 500 includes various numbers of second electrodes 404, piezoelectric sensor elements 306 and receiver circuits 504. Further, in various embodiments each or a portion of each piezoelectric elements 306 may share the same first electrode 402.

In some embodiments, the array 500 of sensors elements 306 comprising the sensor module 204 is part of a TFT panel. For example, the array 500 of sensors elements 306 and/or the receiver circuits 504 may be manufactured with TFT technology, the substrate 514 may be TFT glass, and the second electrode 404 may be a top layer of the TFT panel. The top electrode of the TFT panel may be placed in direct contact with the array 500, or be the second electrode 404 of the array 500 of piezoelectric transducers being in contact with the piezoelectric material 406. Alternatively, the TFT substrate containing an array of the detection module 502 may be connected to the array 500 of sensor elements 306 configured as piezoelectric transducers in a fashion similar to how a readout IC (ROIC) is attached to an image sensing array.

FIG. 5 shows a specific example of the array 500 and detection module 502, and other embodiments may differ. For example, some embodiments may have a different number of rows, a different number or columns, or a different number of total pixels (i.e., sensor elements 306). As another example, some embodiments may not have a column multiplexer module 508. As a further example, some embodiments utilizing TFT technology may have different components than shown in FIG. 5 residing on the same TFT panel. As yet another example, some embodiments may contain a many-to-one or one-to-many ratio between receiver circuits 504 and sensor elements 306. That is, some embodiments may have a many-to-one ratio where one sensor element 306 is shared by multiple receiver circuits 504; and some embodiments may have a one-to-many ratio where one receiver circuit 504 is shared by multiple sensor elements 306.

Figure 6:
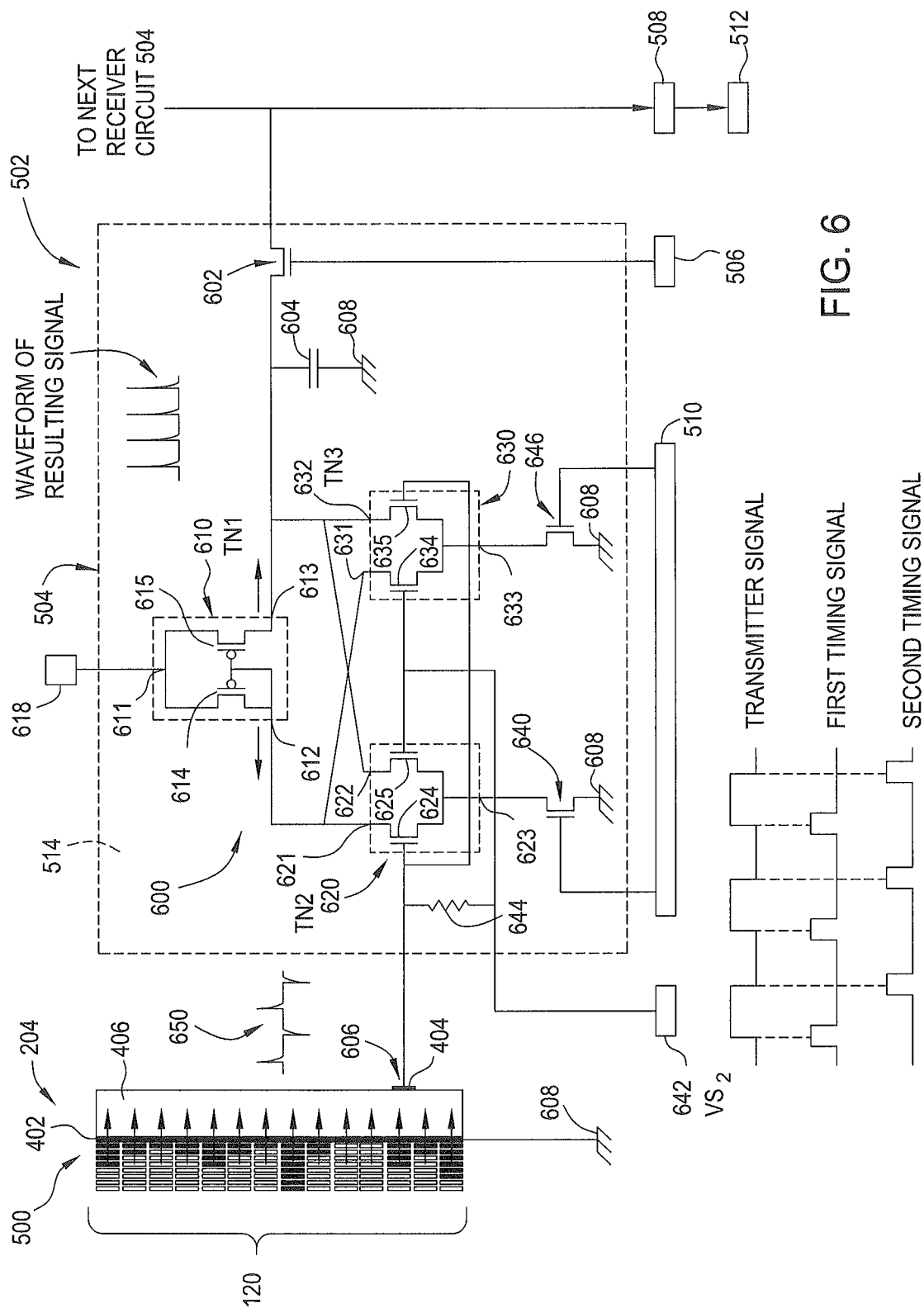
FIG. 6 illustrates one embodiment of a receiver circuit of a detection module coupled to an output of a sensor module.

FIG. 6 illustrates one embodiment of the receiver circuit 504 of the detection module 502 coupled to an output 606 of the sensor module 204. Although only one output 606 is shown connecting one of the sensor elements 306 comprising of the array 500 to a single receiver circuit 504, it is understood that the array 500 includes a plurality of outputs 606 each coupling a respective one of the sensor elements 306 of the array 500 to a respective one of the receiver circuits 504 comprising the detection module 502. The detection module 502 may also include a first switch 602 and a first integrating capacitor 604. As discussed above, the sensor element 306 of the sensor module 204 is operable to make resulting signals available to the receiver circuit 504, the resulting signals including positive and negative polarities, and including effects indicative of the input object 140 relative to the sensing region 120 adjacent the array 500 of the sensor module 204. The receiver circuit 504 is operable to receive the resulting signal from the sensor element 306 and charge the first integrating capacitor 604 coupled to the receiver circuit 504 with a rectified signal in response to receiving the resulting signal. The rectified signal generated by the receiver circuit 504 may be fully rectified or half rectified. Stated in another manner, rectified signal generated by the receiver circuit 504 is of a single polarity regardless of the positive and negative polarities of the received resulting signal. The receiver circuit 504 may generate the rectified signal in response to only the positive polarities of the received resulting signal, the negative polarities of the received resulting signal, or both the positive and negative polarities of the received resulting signal. The receiver circuit 504 may output the resulting signal as described above utilizing any suitable configuration of circuit elements, for example, utilizing one or more current mirrors.

In the embodiment depicted in FIG. 6, an output of the receiver circuit 504 is coupled to the first switch 602 and to the first integrating capacitor 604. The receiver circuit 504, the first switch 602 and the first integrating capacitor 604 may be embodied as an integrated circuit. In the embodiment depicted in FIG. 6, the first switch 602 may be in the form of a transistor, which may be activated by a signal from the row select module 506. When activated to open, the first switch 602 couples the first integrating capacitor 604 to the readout circuitry 512, thereby allowing the first integrating capacitor 604 to be addressable by the processing system 110 so that information of the input object 140 relative to the sensing region 120 may be determined.

The receiver circuit 504 is illustrated in the embodiment of FIG. 6 as a transistor network 600. The transistor network 600 is operable to receive the resulting signal from the sensor element 306 and charge the first integrating capacitor 604 coupled to the receiver circuit 504 with the rectified signal in response to receiving the resulting signal. In one embodiment, the transistor network 600 includes a first transistor network 610, a second transistor network 620, and a third transistor network 630. The first transistor network 610 includes an input 611, a first output 612 and a second output 613. The input 611 of the first transistor network 610 is coupled to a constant first voltage source 618 that provides a constant voltage to the first transistor network 610. The first output 612 of the first transistor network 610 is coupled to a first input 621 of the second transistor network 620 and a first input 631 of the third transistor network 630. The second output 613 of the first transistor network 610 is coupled to a second input 622 of the second transistor network 620 and a second input 632 of the third transistor network 630. In one embodiment, the first transistor network 610 includes two transistors 614, 615 arranged as a current mirror, such that the transistors 614, 615 share the common input 611, while the transistor 614 provides the first output 612 and the transistor 615 provides the second output 613.

The second transistor network 620 and the first transistor network 610 may be activated to charge the first integrating capacitor 604 in response to receiving the positive polarities of the resulting signal received from the sensor module 204. The gate of transistor 624 of the second transistor network 620 is coupled to an output 606 of one of the sensor elements 306 comprising the array 500. In one embodiment the output 606 of the sensor elements 306 is the second electrode 404. An output 623 of the second transistor network 620 is coupled to substantially constant voltage value (i.e., system ground or some other substantially constant voltage value) 608 through a second switch 640. The second switch 640 may be in the form of a transistor, operable to couple the output 623 of the second transistor network 620 to ground 608 in response to receipt of the first timing signal provided by the timing module 510.

In the embodiment depicted in FIG. 6, the second transistor network 620 includes a first transistor 624 and a second transistor 625. The first transistor 624 is operable to connect the first input 621 with the output 623 while the second transistor 625 is operable to connect the second input 622 with the output 623. A voltage signal is developed across the resistor 644 in response to charge from the output 606 of the array 500 flowing through the resistor 644. The current through the first transistor 624 changes in response to receipt of this resulting voltage signal. The current through the second transistor 625 changes in the opposite direction so that the sum of currents through transistors 624 and 625 remains substantially constant.

The third transistor network 630 and the first transistor network 610 may be activated to charge the first integrating capacitor 604 in response to receiving the negative polarities of the resulting signal received from the sensor module 204. The gate of transistor 635 of the third transistor network 630 is coupled to the output 606 of one of the sensor elements 306 comprising the array 500. An output 633 of the second transistor network 630 is coupled to substantially constant voltage value (i.e., system ground or some other substantially constant voltage value) source 608 through a third switch 646. The third switch 646 may be in the form of a transistor, operable to couple the output 633 of the third transistor network 630 to substantially constant voltage value source 608 in response to receipt of the second timing signal provided by the timing module 510.

In the embodiment depicted in FIG. 6, the third transistor network 630 includes a first transistor 634 and a second transistor 635. The first transistor 634 is operable to connect the first input 631 with the output 633 while the second transistor 635 is operable to connect the second input 632 with the output 633. A voltage signal is developed across the resistor 644 in response to charge from the output 606 of the array 500 flowing through the resistor 644. The current through the second transistor 635 changes in response to receipt by transistor 635 of this resulting voltage signal. The current through the first transistor 634 changes in the opposite direction so that the sum of currents through transistors 634 and 635 remains constant.

In one embodiment, the transistor network 600 described above provides charge to the first integrating capacitor 604 with a polarity responsive to which switch 640, 646 is closed. Thus, by providing either of the first or second timing signals to control the open/closed state of the switches 640, 646, the portions of the transistor network 600 may be selectively activated to integrate a charge onto the first integrating capacitor 604, either during periods of the positive polarities of the resulting signal, during periods of the negative polarities of the resulting signal, or during periods of both positive and negative polarities of the resulting signal.

In various embodiments, a second receiver circuit 504 is operative to charge a second integrating capacitor 604 utilizing another transistor network 600 in a similar manner as described above. Respective groups of associated receiver circuits (such as receiver circuit 504), integrating capacitors (such as integrating capacitor 604) and switches (such as switch 602) are utilized for the other remaining sensor elements 306 comprising the array 500 to handle the resulting signals from each output 606 of the sensor elements 306.

In the embodiment depicted in FIG. 6, the transistor network 600 comprises receiver circuit 504 and associated first switch 602 and first integrating capacitor 604, which may be matched one-to-one with each sensor element 306 comprising the array 500 of piezoelectric transducers. In various embodiments, transistor network 600 may be one of an array of transistor networks. The arrays of transistor networks (one of which is shown in FIG. 6), may be fabricated using TFT processes on glass or another substrate. The receiver circuit 504 of FIG. 6 may be operated to (a) synchronously rectify charge pulses from the piezoelectric transducer (which varies in polarity with the leading and trailing edge of the ultrasound pulse), (b) amplify the rectified pulses, (c) integrate and store the rectified and amplified charge pulses onto a storage capacitor, (d) allow range-gating, and (e) provide addressable readout of the charge stored on a storage capacitor.

In the embodiment depicted in FIG. 6, an ultrasound wave front, for example, a transmitter signal driven onto the sensor module 204, impinges on the piezoelectric material 406 of the sensor element 306. The common electrode serves as the first electrode 402 for all of the sensor elements 306 in the array 500, and is grounded in this example. One second electrode 404 of the many second electrodes 404 comprising the array 500 is shown in FIG. 6, while the other second electrodes 404 are not shown for the sake of clarity, but it is to be understood that the non-shown second electrodes 404 are each coupled to a respective and separate receiver circuit 504 comprising the detection module 502. The shading of the wave front indicates that the front has different magnitudes at different portions of the common first electrode 402, and affects different portions of the piezoelectric material 406 differently. The part of the waveform affecting the piezoelectric material 406 associated with the second electrode 404 shown causes charge to flow through the resistor 644, generating a voltage waveform shown as waveform 650. In one embodiment, the voltage waveform 650 is the resulting signal at the gate of the transistor 624 in the receiver circuit 504.

The receiver circuit 504 shown in FIG. 6 may be operated as follows. The timing module 510 generates the first signal that defines when the ultrasound transmitter module 520 emits ultrasound waves that are driven onto the array 500. The timing of the ultrasound waves may be based on the finest feature to be imaged. For example, various embodiments of the timing module 510 may produce waves at 1 MHz-1 GHz, where higher frequencies are more conducive to detection of smaller features of the input object 140 within the sensing region 120.

The timing module 510 also generates the first and second signals that correlate with the rising edges and the falling edges (i.e., the positive and negative polarities) of the ultrasound pulses (i.e., the transmitter signal) impinging on the piezoelectric material 406, which in turn generate the resulting signal with correlating positive and negative polarities. The widths and positions of these highs of the first and second signals may be determined for synchronous rectification, range-gating, and/or some other consideration. Range-gating, to control the depth of the plane to be imaged, may be accomplished by adjusting the timing of the first and second signals relative to the pulse timing applied to the ultrasound transmitter module 520 by the timing module 510.

Thus, the first signal is high during the time period at which the leading edge of each ultrasound pulse of the transmitter signal propagates through the sensor element 306, and this turns on the second switch 640 during the leading edge of each ultrasound wave. When the second switch 640 is activated, current is allowed to flow through transistors 624, 625, 614 and 615. Meanwhile, the second timing signal is low, keeping transistors 646, 634 and 635 off. This results in charge being integrated onto the integrating capacitor during only positive portions of the resulting signal.

The current flowing through transistor 624 is (I+i(t)). I is a quiescent current that results from the voltage provided by the second voltage source 642, and i(t) is a current of a first polarity (e.g., positive current) due to the voltage developed across the resistor 644 as charge of a first polarity (e.g., positive charge) is generated by the piezoelectric material 406.

The current mirror formed by the first transistor network 610 mirrors the current flowing through the transistor 624 (I+i(t)) through the transistor 615. The same quiescent current, I, flows through transistor 625 due to the voltage provided by the second voltage source 642. Thus, a net current of i(t) flows into the first integrating capacitor 604.

Analogously, when the second timing signal provided by the timing module 510 is high and first timing signal is low during the falling edge (i.e., the negative polarities) of each ultrasound pulse of the transmitter signal, a charge of a second polarity opposite to the first polarity (e.g., negative charge) is generated by the piezoelectric material 406. However, with rectification, the current flow into the first integrating capacitor 604 is still current of the first polarity (e.g., a positive current) i(t).

After N number ultrasound transmitter signal pulses, the charge on the first integrating capacitor 604 is increased by the amount $\Delta Q$, where $\Delta Q = 2N \times |\Delta q| \times ROLOAD \times gm \times K$. In this equation, $\Delta Q$=charge increase on the first integrating capacitor 604, N=number of pulses in the transmitter signal, $\Delta q$=charge generated by the piezoelectric material 406 at each edge of an ultrasound pulse of the transmitter signal, ROLOAD=load resistance in the receiver circuit 504, gm=small-signal transconductance of transistors 624, 625, 634 and 635 and K=current ratio of the current mirror provided by the first transistor network 610. Some embodiments may use K=1 for improved matching.

After M ultrasound transmitter signal pulses have been received, the first switch 602 is turned on by a row select signal provided by the row select module 506. M may be a predefined number of transmitter signal pulses. When the first switch 602 is on, the first integrating capacitor 604 is connected through the first switch 602 to the external readout circuitry 512. The readout circuitry 512 can read the voltage on the first integrating capacitor 604 and then determine the accumulated charge based on this voltage, or directly read the charge accumulated on integrating capacitor 604. After readout is complete, the readout circuitry 512 can reset the first integrating capacitor 604 prior to opening the first switch 602 and readying the receiver circuit 504 for another iteration of detecting presence of the input object relative to the sensing region 120.

Some embodiments read the voltage on integrating capacitor 604. Other embodiments read the accumulated charge rather than the voltage on integrating capacitor 604. The other embodiments may be designed such that: (1) voltage-dependent nonlinearities of the value of integrating capacitor 604 do not substantially affect the amount of stored charge, (2) process and temperature variations of the value of integrating capacitor 604 do not affect the amount of stored charge, (3) parasitic capacitance on the pixel column node (i.e., sensor element 306) does not affect the amount of stored charge, or for some other reason.

Also, many alternatives and variations of the circuit of FIG. 6 are possible. For example, cascode transistors may be added in series with each of the transistors comprising the second and third switches 640, 646 (between the second switch 640 and the node common to transistors 624, 625, and between the third switch 646 and the node common to transistors 634, 635). This configuration may increase the linear operating range of the receiver circuit 504. As another example, a super current mirror, such as a Wilson-super current mirror, may be used in place of the mirror provided by the first transistor network 610. This configuration of the receiver circuit 504 can increase the accuracy and/or the linear operating range of the circuit.

As yet another example, the receiver circuit 504 may be built on some other type of substrate or using some other processes. As a specific example, the circuitry may be built on a semiconductor substrate (such as a silicon wafer) using semiconductor processing technology. In some embodiments, the second electrodes 404 are connected to the relevant pixel columns by row-select transistors disposed on a TFT. In other embodiments, the receiver circuits 504 are not on the TFT, but are parts of integrated circuits such as ASICs which may reside on a flexible tail coupled to the substrate 514, or in another part of the processing system 110 or electronic system utilizing the input device 100. The pixel columns are communicatively coupled to the ASIC, and thus selectively coupled to the relevant receiver circuits 504. Operation can be analogous to what is discussed above. Such embodiments may provide for higher performance or speed in some cases.

It is contemplated that at least one or more of the receiver circuits 504, the timing module 510 and the readout circuitry 512 comprising the detection module 502 may be embodied in an integrated circuit, such as ASICs. For example, the receiver circuits 504, the timing module 510 and the readout circuitry 512 may be embodied in a single integrated circuit.

In another example, the receiver circuits 504, the timing module 510 and the readout circuitry 512 may be embodied in two or more separate and communicating integrated circuits. The receiver circuits 504 residing in the integrated circuit are coupled to the array 500 of the sensor module 204 as described above, while the readout circuitry 512 makes information obtained from the array 500 available for use by the electronic system incorporating the input device 100. The proximity of the integrated circuit to the array 500 reduces the combination time between the circuits and sensors, thereby allowing faster read times and sampling. The proximity of the integrated circuit(s) to the array 500 also reduces potential damage due to electrostatic discharge (ESD) and additionally improves the accuracy of signal transmission through reduced susceptibility to electromagnetic interference (EMI).

Also, the receiver circuits 504 described herein are generally applicable for use with sensor elements 306 configured as piezoelectric ultrasound detectors. For example, it is applicable to a wide variety of shapes and arrangements of piezoelectric detectors, and it is applicable regardless of the location of the input object 140 to be imaged and the ultrasound transmitter of the ultrasound wave, as long as the reflected wave reaches the detectors. As another example, the described receiver circuit 504 may be used in a phased array of receivers to accomplish beam steering for A-mode or B-mode ultrasound imaging. The phasing may be accomplished by adjusting the timing of the first and second timing signals on a per-pixel basis.

Figure 7:
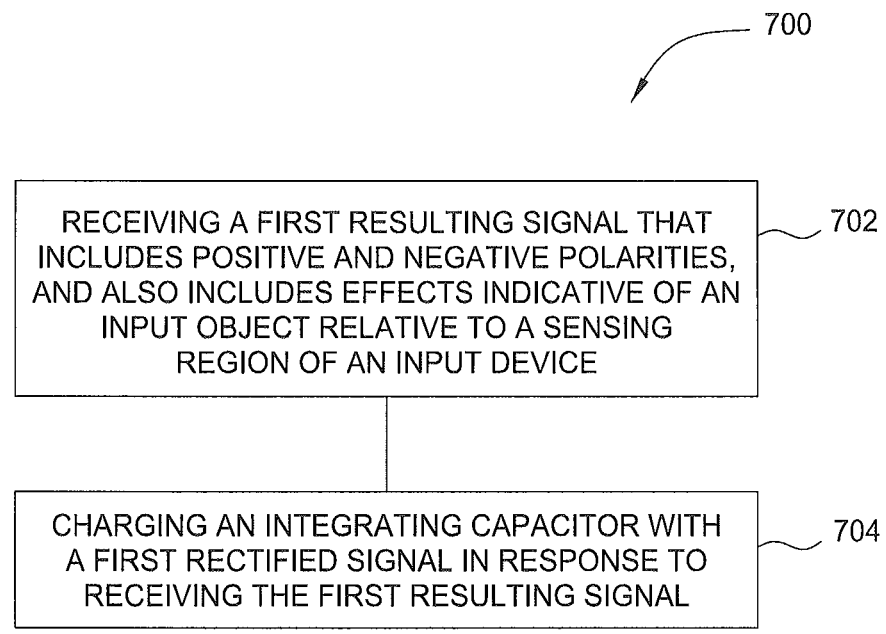
FIG. 7 is a flow diagram of one embodiment of a method for sensing an input object relative to a sensing region of an ultrasound sensor device.

FIG. 7 is a flow diagram of one embodiment of a method 700 for sensing an input object relative to a sensing region of an ultrasound sensor device that may be practiced using at least a portion of the input device 100 or other suitable input device. The method 700 begins at step 702 by receiving a first resulting signal. As discussed above, the first resulting signal includes positive and negative polarities, and also includes effects indicative of the input object 140 relative to the sensing region 120. At step 704, the first integrating capacitor 604 is charged with a first rectified signal in response to receiving the first resulting signal.

The method 700 may further include the step of driving the transmitter signal onto a plurality of pixel electrodes of a piezoelectric transducer array, a first pixel electrode of the plurality of pixel electrodes providing the first resulting signal, wherein the pixel electrodes are the parts of the sensor elements 306 of the array 500.

The method 700 may also further include the step of generating the first rectified signal in response to a timing signal synchronized with the transmitter signal.

The method 700 may also further include the step of receiving a second resulting signal comprising positive and negative polarities, the second resulting signal comprising effects indicative of the input object relative to the sensing region, wherein the second resulting signal is received from a second pixel electrode of the plurality of pixel electrodes. The method 700 may also further include the step of charging a second integrating capacitor with a second rectified signal in response to receiving the second resulting signal.

The method 700 may also further include the step of integrating charge onto the integrating capacitor in response to at least one of the positive and the negative polarities of the first resulting signal.

Thus, subsystem, system and method for sensing an input object relative to a sensing region of an ultrasound sensor device have been described. The invention described herein is less susceptible to damage and/or inaccurate output due to electrostatic interference (EMI) and electromagnetic discharge (ESD) as compared to conventional capacitive sensing devices. Moreover, the ultrasonic sensing system described herein enables the detection of both conductive and non-conductive objects relative to the sensing region, thus allowing a wide variety of inputs device types to be utilized. Furthermore, the ultrasonic sensing system described herein less susceptible to inaccuracies due to the effects of dirt, oils and other contaminants as compared to conventional optical sensing devices, thereby providing a more robust input device.

What is claimed is:

1. A subsystem for sensing an input object relative to a sensing region of a sensor device, the subsystem comprising:
 a first circuit comprising:
  an input for receiving a first resulting signal, wherein the first resulting signal is in a form of a waveform comprising positive and negative polarities, the first resulting signal comprising effects indicative of the input object relative to the sensing region;
  a first transistor network;
  a second transistor network; and
  an output;
 a first switch coupled to the output of the first circuit; and
 a first integrating capacitor coupled to the output of the first circuit, to a substantially constant voltage source and to the first switch, wherein the second transistor network and the first transistor network provide a first portion of a first rectified signal to the first integrating capacitor based on the positive polarities of the resulting signal.

2. The subsystem of claim 1, wherein the sensing region of the sensor device comprises an ultrasound sensor device.

3. The subsystem of claim 1, wherein the sensor device is configured as a fingerprint sensing device.

4. The subsystem of claim 1, wherein the first circuit further comprises:
 a third transistor network operable with the first transistor network to provide a second portion of the first rectified signal to the first integrating capacitor based on the negative polarities, the first portion of the first rectified signal and the second portion of the first rectified signal having the same polarity.

5. The subsystem of claim 4, wherein the first circuit is operable to:
 turn on the second transistor network in response to a first timing signal; and
 turn on the third transistor network in response to a second timing signal.

6. The subsystem of claim 1 further comprising:
 a second circuit having an input for receiving a second resulting signal comprising positive and negative polarities, the second resulting signal comprising effects indicative of the input object relative to the sensing region; and
 a second integrating capacitor coupled to the output of the second circuit, wherein the circuit is operable to output a rectified signal to the second integrating capacitor.

7. The subsystem of claim 1, wherein the first transistor network and the second transistor network are disposed on a thin-film transistor substrate.

8. A system for sensing an input object relative to a sensing region of a sensor device, the system comprising:
 a first substrate;
 an array of sensor electrodes disposed on the first substrate and operable to provide a first resulting signal, wherein the first resulting signal is in a form of a waveform comprising positive and negative polarities in response to presence of the input object in the sensing region; and
 a detection module comprising a first input coupled to the array of sensor electrodes, an output, and a plurality of transistor networks, wherein the plurality of transistor networks provide a first rectified signal to a first integrating capacitor of the detection module, wherein the first rectified signal is based on the first resulting signal.

9. The system of claim 8 further comprising:
a second substrate, wherein the second substrate is a thin-film transistor substrate; and
wherein at least a portion of the detection module is disposed on the second substrate.

10. The system of claim 8, wherein the first substrate is a thin-film transistor substrate.

11. The system of claim 8 further comprising:
a transmitter module configured to drive the transmitter signal onto the array of sensor electrodes.

12. The system of claim 8, wherein providing the first rectified signal to the first integrating capacitor comprises:
providing a first portion of the rectified signal based on positive polarities of the first resulting signal; and
providing a second portion of the rectified signal based on negative polarities of the first resulting signal.

13. The system of claim 8, wherein the sensor device is an ultra-sound sensor device.

14. The system of claim 8, wherein the sensor device is configured to sense fingerprints.

15. The system of claim 8, wherein the detection module further comprises:
a second input configured to receive a second resulting signal from the array of sensor electrodes, wherein the plurality of transistor networks provide a second rectified to a second integrating capacitor of the detection module, wherein the second rectified is based on the second resulting signal.

16. A method for sensing features of an input object relative to a sensing region of a sensor device, the method comprising:
receiving a first resulting signal, wherein the first resulting signal is in a form of a waveform comprising positive and negative polarities, the first resulting signal comprising effects indicative of the input object relative to the sensing region; and
charging an integrating capacitor with a first rectified signal with at least one of a plurality of transistor networks, wherein the first rectified signal is based on the first resulting signal.

17. The method of claim 16 further comprising:
driving a transmitter signal onto a plurality of pixel electrodes.

18. The method of claim 16, wherein generating the first rectified signal via a plurality of transistor networks comprises generating a first portion of the rectified signal based on the positive polarities and a second portion of the rectified signal based on the negative polarities.

19. The method of claim 16 further comprising:
receiving a second resulting signal comprising positive and negative polarities, the second resulting signal comprising effects indicative of the input object relative to the sensing region, wherein the second resulting signal is received from a second pixel electrode of the plurality of pixel electrodes; and
charging a second integrating capacitor with a second rectified signal with at least one of the plurality of transistor networks, wherein the second rectified signal is based on the second resulting signal.

20. The method of claim 16, wherein the first resulting signal contains effects indicative of ridges and valleys of a fingerprint.

* * * * *